United States Patent
Greenwood

(10) Patent No.: US 11,536,458 B2
(45) Date of Patent: Dec. 27, 2022

(54) USER ENGAGEMENT SYSTEM AND METHODS FOR ADJUSTING A COOKING RECIPE BASED ON AN IDENTIFIED UTENSIL

(71) Applicant: Haier US Appliance Solutions, Inc., Wilmington, DE (US)

(72) Inventor: Todd E. Greenwood, Pewee Valley, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 483 days.

(21) Appl. No.: 16/679,642

(22) Filed: Nov. 11, 2019

(65) Prior Publication Data

US 2021/0140645 A1    May 13, 2021

(51) Int. Cl.
*A47J 37/12*    (2006.01)
*F24C 7/08*     (2006.01)
*G06V 20/64*    (2022.01)

(52) U.S. Cl.
CPC .............. *F24C 7/083* (2013.01); *G06V 20/64* (2022.01)

(58) Field of Classification Search
CPC ......... F24C 7/082; F24C 7/083; G06V 20/44; G06V 20/64; H05B 3/68
USPC .................................... 219/444.1–468.2, 518
See application file for complete search history.

(56) References Cited

U.S. PATENT DOCUMENTS

2011/0253693 A1* 10/2011 Lyons ................. F24C 15/2021
                                                         219/209
2016/0051078 A1*  2/2016 Jenkins ................. A47J 36/321
                                                          99/341

FOREIGN PATENT DOCUMENTS

| CN | 106369639 A     | 2/2017  |
| DE | 102015201079 A1 | 9/2015  |
| EP | 1505350 B1      | 12/2009 |
| KR | 20160069359 A   | 6/2016  |

* cited by examiner

*Primary Examiner* — Sang Y Paik
(74) *Attorney, Agent, or Firm* — Dority & Manning, P.A.

(57) ABSTRACT

A method of operating a user engagement system, as provided herein, may include receiving a recipe selection signal of a predetermined recipe, and receiving a recipe information signal based on the predetermined recipe. The method may further include receiving an image signal from the camera assembly, and identifying a utensil based on the received image signal. The method may still further include initiating a recipe action at the user engagement system.

16 Claims, 6 Drawing Sheets

USER ENGAGEMENT SYSTEM AND METHODS FOR ADJUSTING A COOKING RECIPE BASED ON AN IDENTIFIED UTENSIL

FIELD OF THE INVENTION

The present subject matter relates generally to systems and methods for user engagement during cooking operations or near a cooking appliance.

BACKGROUND OF THE INVENTION

Cooking appliances, such as cooktop or range appliances generally include heating elements for heating cooking utensils, such as pots, pans and griddles. A variety of configurations can be used for the heating elements located on the cooking surface of the cooktop. The number of heating elements or positions available for heating on a cooking appliance can include, for example, four, six, or more depending upon the intended application and preferences of the buyer. These heating elements can vary in size, location, and capability across the appliance.

Recipes or prepared instructions for cooking a specific food item have been a long-standing staple of all types of cooking. Although some individuals are able to cook without the aid of any prepared list of steps, many individuals require a specific set of instructions in order to cook or prepare a desired food item. These recipes may be provided in books, cards, and increasingly, on an electronic user device. A website or software application (i.e., "app") may present a recipe as a dynamic or interactive set of instructions, which many users find easier to understand than a generic printed or text-based recipe.

Unfortunately, existing systems can provide an unsatisfactory user experience and can inhibit a user's desired interactions with a cooking appliance. Recipe books are often cumbersome and difficult to use while cooking. Pages may rip, stain, burn, or become otherwise damaged during use. Moreover, printed materials do not allow for immediate real-time guidance or information. Electronic user devices that are connected to the Internet, such as a computer, tablet or smartphone, may allow for immediate interaction with remote information servers or individuals. Nonetheless, existing devices are generally not suitable for use in tandem with a cooking appliance.

Separate from the medium used to display a recipe, difficulties often arise for users if they do not have the exact type of utensil used to cook an item that was used when creating the recipe. The size, material, or shape of a utensil may, nonetheless, influence how items within the utensil are cooked. Typically, recipes do not provide instructions for how a user can account for this influence or, on occasion, if a given utensil would affect the instructions provided in a recipe. This may be true regardless of whether the recipe is provided in a book, on an electronic user device, or elsewhere. Although utensils can vary greatly, it is generally up to the user to guess whether a particular utensil can be used in accordance with a certain recipe.

As a result, improved systems are needed for facilitating user engagement and interaction during use of a cooking appliance. In particular, it may be advantageous to provide a user engagement system that can adjust or guide a user through a recipe based on the actual utensil being used.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a user engagement system is provided. The method may include receiving a recipe selection signal of a predetermined recipe, and receiving a recipe information signal based on the predetermined recipe. The method may further include receiving an image signal from the camera assembly, and identifying a utensil based on the received image signal. The method may still further include initiating a recipe action at the user engagement system.

In another exemplary aspect of the present disclosure, a method of operating a user engagement system is provided. The method may include receiving a recipe selection signal of a predetermined recipe, and receiving a recipe information signal at a user engagement system based on the predetermined recipe. The recipe information signal may include a plurality of sequenced recipe panels corresponding to the predetermined recipe. The method may further include receiving an image signal of the cooking appliance from the camera assembly, and identifying a utensil based on the received image signal. The method may still further include initiating the user-guided presentation at the image monitor based on the identified utensil.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
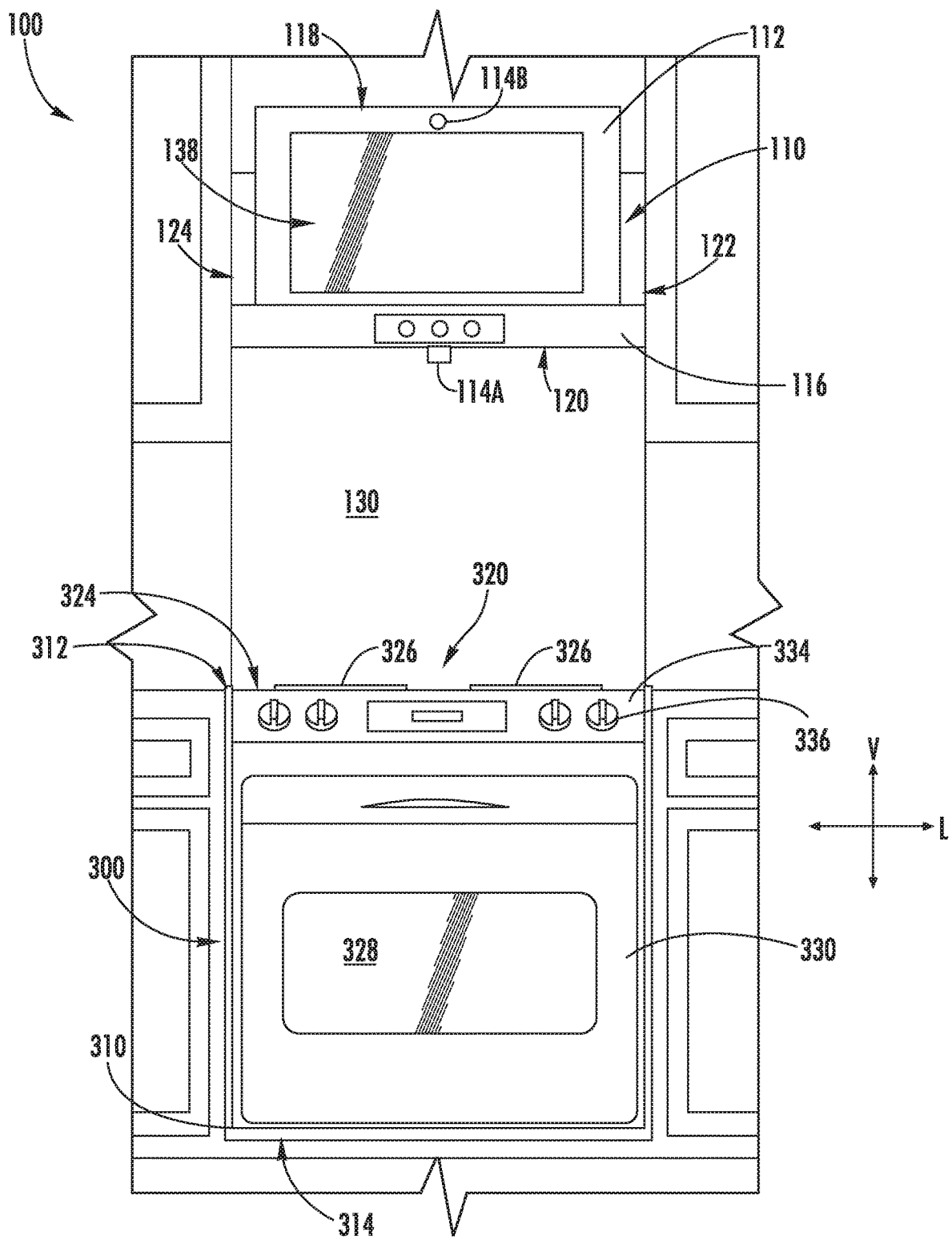
FIG. 1 provides a front elevation view of a system according to exemplary embodiments of the present disclosure.
Figure 2:
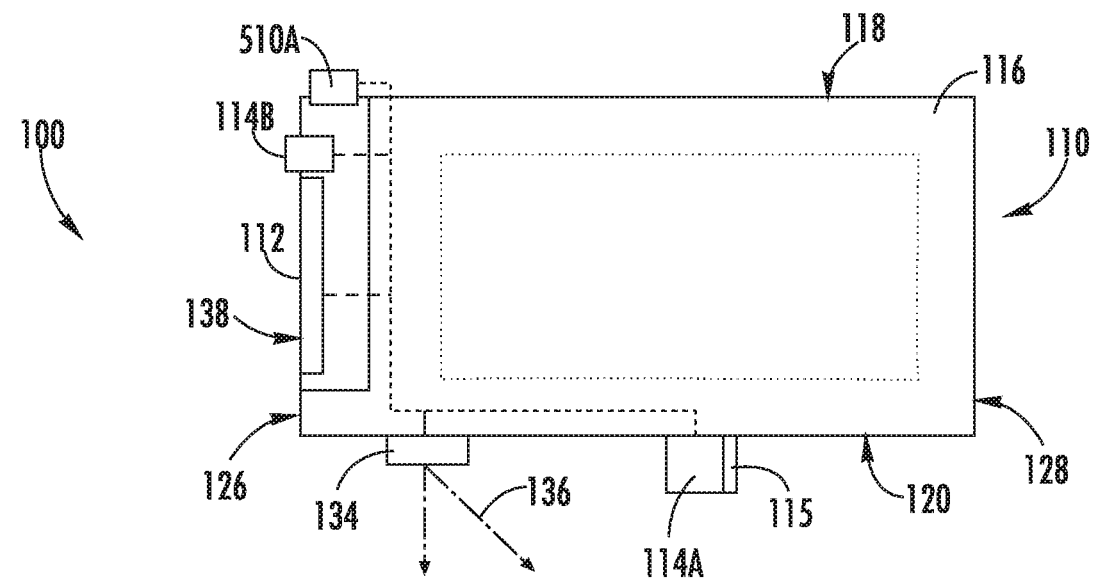
FIG. 2 provides a side schematic view of the exemplary system of FIG. 1.
Figure 2:
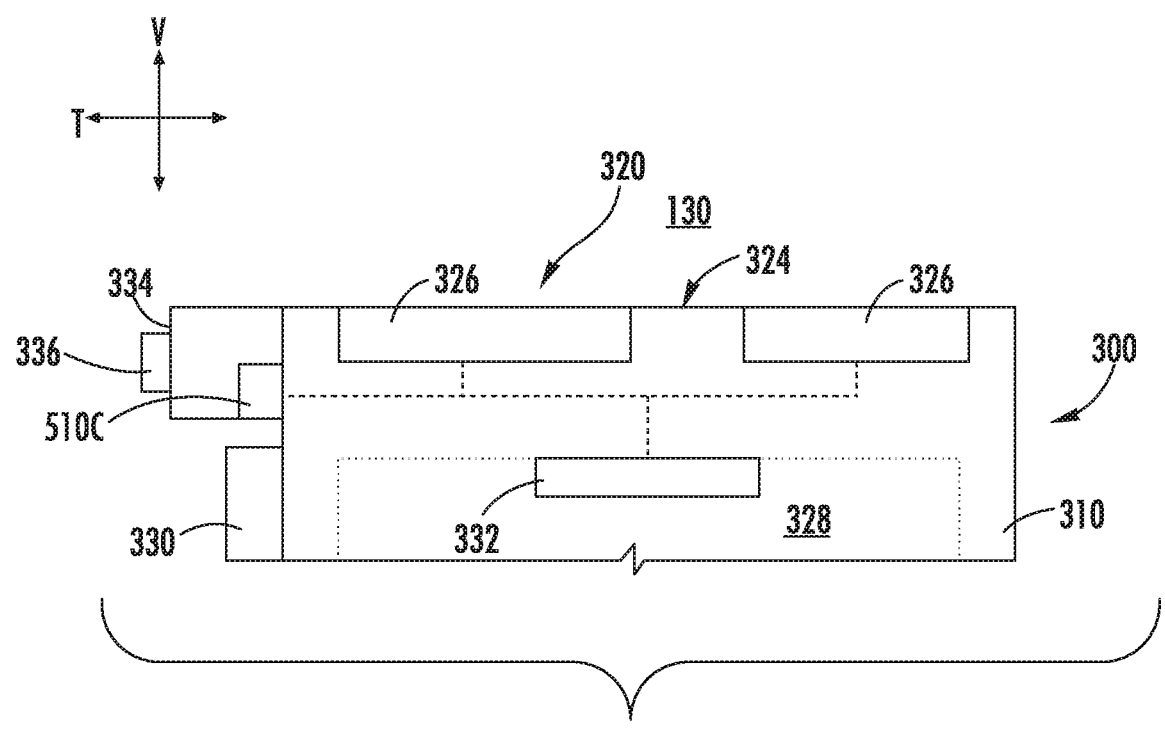
Figure 3:
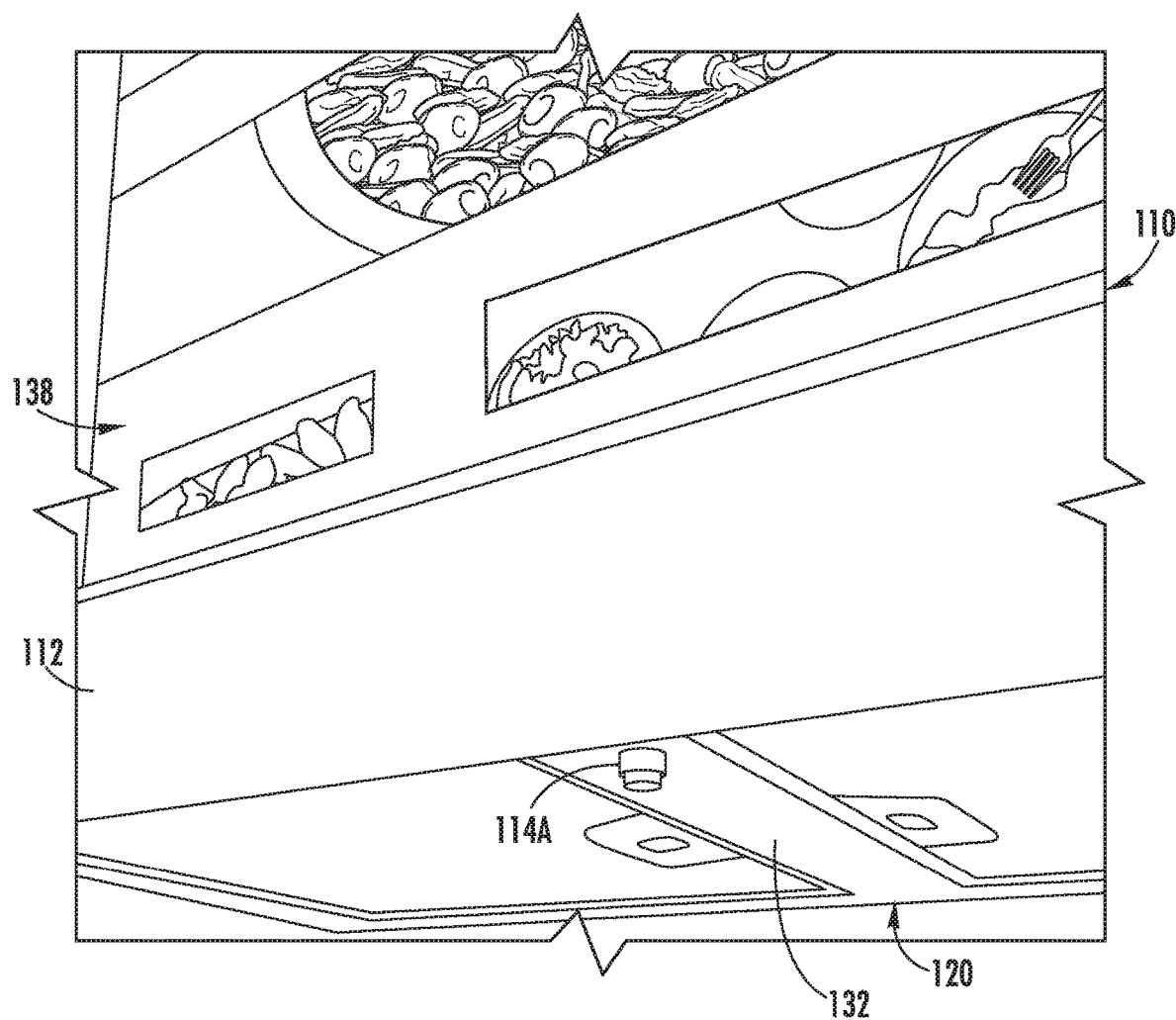
FIG. 3 provides a bottom perspective view of a portion of the exemplary system of FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Turning to the figures, FIGS. 1 through 5 provide various views of a system 100 (or portions thereof) according to exemplary embodiments of the present disclosure. System 100 generally includes a stationary interactive assembly 110 with which a user may interact or engage. Interactive assembly 110 may have a controller 510A that is in operable communication with an image monitor 112 and one or more camera assemblies (e.g., a first camera assembly 114A and second camera assembly 114B) that are generally positioned above a cooking appliance 300.

As shown, a cooking appliance 300, separate from or as part of system 100, defines a vertical direction V, a lateral direction L, and a transverse direction T, for example, at a cabinet 310. The vertical, lateral, and transverse directions are mutually perpendicular and form an orthogonal direction system. As shown, cooking appliance 300 extends along the vertical direction V between a top portion 312 and a bottom portion 314; along the lateral direction L between a left side portion and a right side portion; and along the traverse direction T between a front portion and a rear portion.

Cooking appliance 300 can include a chassis or cabinet 310 that defines a cooking zone 320 wherein one or more cooking operations may be performed by a user (e.g., heating or preparing food items according to a recipe). For example, the cooking zone 320 may be defined by a top surface 324 of the cabinet 310. As illustrated, top surface 324 may optionally one or more heating elements 326 for use in, for example, heating or cooking operations. In exemplary embodiments, top surface 324 is constructed with ceramic glass. In other embodiments, however, top surface 324 may include another suitable material, such as a metallic material (e.g., steel) or another suitable non-metallic material. Heating elements 326 may be various sizes and may employ any suitable method for heating or cooking an object, such as a cooking utensil 322, and its contents. In one embodiment, for example, heating element 326 uses a heat transfer method, such as electric coils or gas burners, to heat the cooking utensil 322. In another embodiment, however, heating element 326 uses an induction heating method to heat the cooking utensil 322 directly. In turn, heating element 326 may include a gas burner element, resistive heat element, radiant heat element, induction element, or another suitable heating element.

In some embodiments, cooking appliance 300 includes an insulated cabinet 310 that defines an additional or alternative cooking zone within cooking chamber 328 selectively covered by a door 330. One or more heating elements 332 (e.g., top broiling elements or bottom baking elements) may be enclosed within cabinet 310 to heat cooking chamber 328. Heating elements 332 within cooking chamber 328 may be provided as any suitable element for cooking the contents of cooking chamber 328, such as an electric resistive heating element, a gas burner, microwave element, halogen element, etc. Thus, cooking appliance 300 may be referred to as an oven range appliance. As will be understood by those skilled in the art, cooking appliance 300 is provided by way of example only, and the present subject matter may be used in any suitable cooking appliance 300, such as a double oven range appliance, standalone oven, or a standalone cooktop (e.g., fitted integrally with a surface of a kitchen counter). Thus, the exemplary embodiments illustrated in the figures are not intended to limit the present subject matter to any particular cooking chamber or heating element configuration, except as otherwise indicated.

As illustrated, a user interface or user interface panel 334 may be provided on cooking appliance 300. Although shown at the front portion of cooking appliance 300, another suitable location or structure (e.g., a backsplash) for supporting user interface panel 334 may be provided in alternative embodiments. In some embodiments, user interface panel 334 includes input components or controls 336, such as one or more of a variety of electrical, mechanical, or electro-mechanical input devices. Controls 336 may include, for example, rotary dials, knobs, push buttons, and touch pads. A controller 510C is in communication with user interface panel 334 and controls 336 through which a user may select various operational features and modes and monitor progress of cooking appliance 300. In additional or alternative embodiments, user interface panel 334 includes a display component, such as a digital or analog display in communication with a controller 510C and configured to provide operational feedback to a user. In certain embodiments, user interface panel 334 represents a general purpose I/O ("GPIO") device or functional block.

As shown, controller 510C is communicatively coupled (i.e., in operative communication) with user interface panel 334 and its controls 336. Controller 510C may also be communicatively coupled with various operational components of cooking appliance 300 as well, such as heating elements (e.g., 326, 332), sensors, etc. Input/output ("I/O") signals may be routed between controller 510C and the various operational components of cooking appliance 300. Thus, controller 510C can selectively activate and operate these various components. Various components of cooking appliance 300 are communicatively coupled with controller 510C via one or more communication lines such as, for example, conductive signal lines, shared communication busses, or wireless communications bands.

In some embodiments, controller 510C includes one or more memory devices 514C and one or more processors 512C. The processors 512C can be any combination of general or special purpose processors, CPUs, or the like that can execute programming instructions or control code associated with operation of cooking appliance 300. The memory devices 514C (i.e., memory) may represent random access memory such as DRAM or read only memory such as ROM or FLASH. In one embodiment, the processor 512C executes programming instructions stored in memory 514C. The memory 514C may be a separate component from the processor 512C or may be included onboard within the processor 512C. Alternatively, controller 510C may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 510C includes a network interface 520C such that controller 510C can connect to and communicate over one or more networks (e.g., network 502) with one or more network nodes. Controller 510C can also include one or more transmitting, receiving, or transceiving components for transmitting/receiving communications with other devices communicatively coupled with cooking appliance 300. Additionally or alternatively, one or more transmitting, receiving, or transceiving components can be located off board controller 510C. Generally, controller 510C can be positioned in any suitable location throughout cooking appliance 300. For example, controller 510C may be located proximate user interface panel 334 toward the front portion of cooking appliance 300.

As shown, one or more casings (e.g., hood casing 116) may be provided above cooking appliance 300 along the vertical direction V. For example, a hood casing 116 may be positioned above cooking appliance 300 in a stationary mounting (e.g., such that operation of interactive assembly 110 is not permitted unless casing 116 is mounted at a generally fixed or non-moving location). Hood casing 116 includes a plurality of outer walls and generally extends along the vertical direction V between a top end 118 and a bottom end 120; along the lateral direction L between a first side end 122 and a second side end 124; and along the transverse direction T between a front end 126 and a rear end 128. In some embodiments, hood casing 116 is spaced apart from cooking zone 320 or top surface 324 along the vertical direction V. An open region 130 may thus be defined along the vertical direction V between cooking zone 320 (or top surface 324) and bottom end 120.

In optional embodiments, hood casing 116 is formed as a range hood. A ventilation assembly within hood casing 116 may thus direct an airflow from the open region 130 and through hood casing 116. However, a range hood is provided by way of example only. Other configurations may be used within the spirit and scope of the present disclosure. For example, hood casing 116 could be part of a microwave or other appliance designed to be located above cooking appliance 300 (e.g., directly above top surface 324). Moreover, although a generally rectangular shape is illustrated, any suitable shape or style may be adapted to form the structure of hood casing 116.

In certain embodiments, one or more camera assemblies 114A, 114B are provided to capture images (e.g., static images or dynamic video) of a portion of cooking appliance 300 or an area adjacent to cooking appliance 300. Generally, each camera assembly 114A, 114B may be any type of device suitable for capturing a picture or video. As an example, each camera assembly 114A, 114B may be a video camera or a digital camera with an electronic image sensor [e.g., a charge coupled device (CCD) or a CMOS sensor]. A camera assembly 114A or 114B is generally provided in operable communication with controller 510A such that controller 510A may receive an image signal (e.g., static picture signal or video signal) from camera assembly 114A or 114B corresponding to the picture(s) captured by camera assembly 114A or 114B. Once received by controller 510A, the image signal (e.g., static picture signal or video signal) may be further processed at controller 510A (e.g., for viewing at image monitor 112) or transmitted to a separate device (e.g., remote server 404). Optionally, one or more microphones (not pictured) may be associated with one or more of the camera assemblies 114A, 114B to capture and transmit audio signal(s) coinciding (or otherwise corresponding) with the captured image signal or picture(s).

Figure 5:
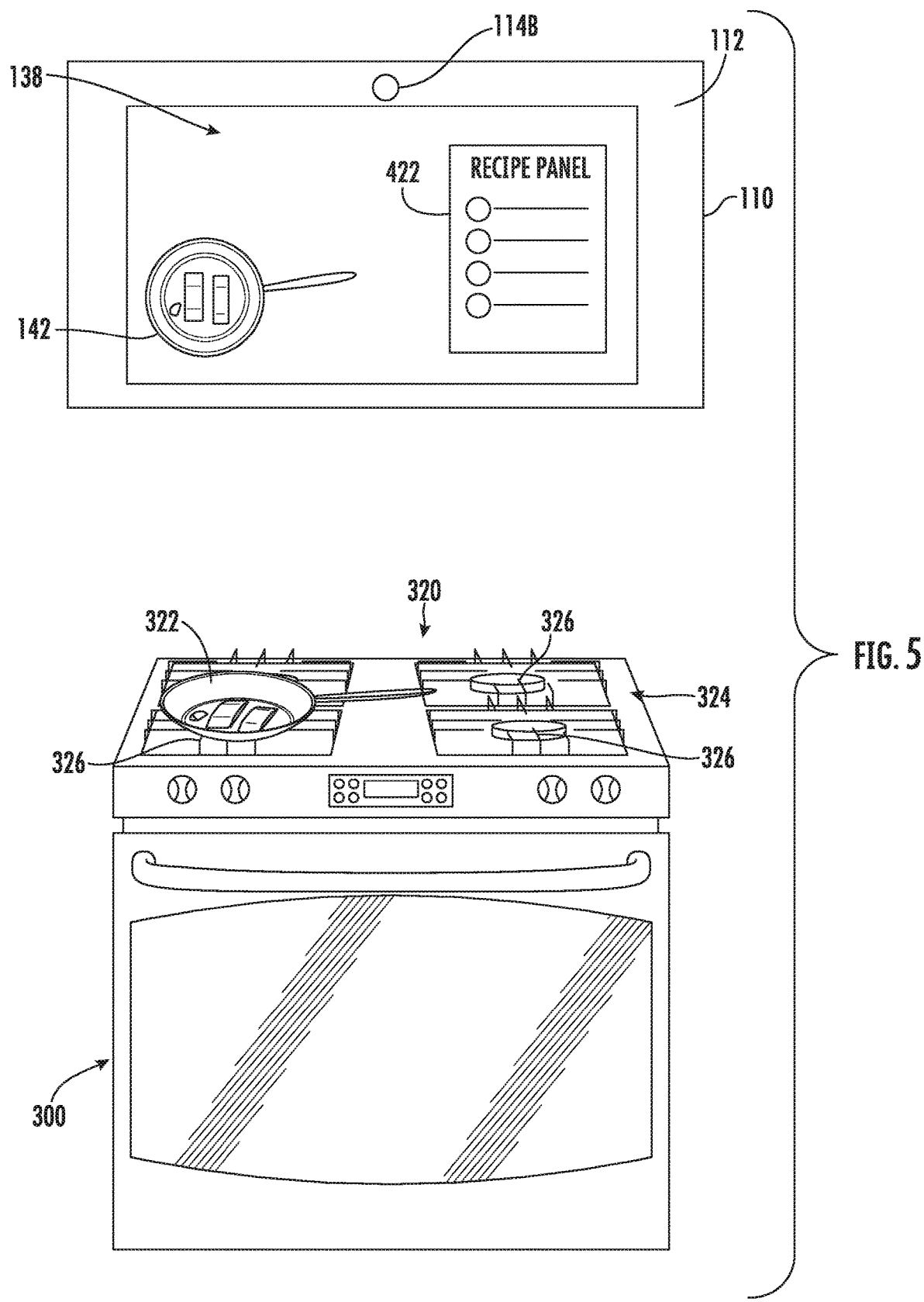
FIG. 5 provides a front perspective view of a system according to exemplary embodiments of the present disclosure.

In some embodiments, one camera assembly (e.g., first camera assembly 114A) is directed at cooking zone 320 (e.g., top surface 324). In other words, first camera assembly 114A is oriented to capture light emitted or reflected from cooking zone 320 through the open region 130. In some such embodiments, first camera assembly 114A can selectively capture an image covering all or some of top surface 324. For instance, first camera assembly 114A may capture an image covering one or more heating elements 326 of cooking appliance 300. In some such embodiments, the captured utensil 322 placed on one of the heating elements 326 (or otherwise between cooking zone 320 and first camera assembly 114A) may be recorded and transmitted instantly to another portion of system (e.g., controller 510A or image monitor 112) as part of a single static picture or as a real-time video feed. Optionally, the single static picture or real-time video feed may include a digital picture or representation 142 of a utensil 322 on, or proximate to, cooking zone 320 (e.g., as illustrated in FIG. 5). Additionally or alternatively, an image signal corresponding to the captured utensil 322 may be transmitted to controller 510A. From (e.g., based on) the received image signal, controller 510A may automatically (e.g., without direct user input) identify the utensil 322, including one or more physical features thereof. The physical features may include the material from which utensil 322 is formed, the size (e.g., physical dimensions, such as length in centimeters, in the vertical direction V, lateral direction L, or transverse direction T) of utensil 322, the shape (e.g., two-dimensional or three-dimensional profile outline) of utensil 322, etc. As is understood, recognizing or identifying such items, may be performed by edge matching, divide-and-conquer search, greyscale matching, histograms of receptive field responses, or another suitable routine (e.g., executed at the controller 510A based on one or more captured images from camera assembly 114A).

As shown, first camera assembly 114A is positioned above cooking appliance 300 (e.g., along the vertical direction V). In some such embodiments, first camera assembly 114A is mounted (e.g., fixedly or removably) to hood casing 116. A cross-brace 132 extending across hood casing 116 (e.g., along the transverse direction T) may support first camera assembly 114A. When assembled, first camera assembly 114A may be positioned directly above cooking zone 320 or cabinet 310, generally. Optionally, first camera assembly 114A may be directed such that a line of sight is defined from first camera assembly 114A that is perpendicular to top surface 324.

In additional or alternative embodiments, one camera assembly (e.g., second camera assembly 114B) is directed away from cooking zone 320 or top surface 324. In other words, second camera assembly 114B is oriented to capture light emitted or reflected from an area other than top surface 324. In particular, second camera assembly 114B may be directed at the area in front of cooking appliance 300 (e.g., directly forward from cooking appliance 300 along the transverse direction T). Thus, second camera assembly 114B may selectively capture an image of the area in front of cooking zone 320. This area may correspond to or cover the location where a user would typically stand during use of cooking appliance 300. During use, a user's face or body may be captured by second camera assembly 114B while the user is standing directly in front of cooking appliance 300. Optionally, second camera assembly 114B may be directed such that a line of sight is defined from second camera assembly 114B that is non-orthogonal to top surface 324 (e.g., between 0° and 45° relative to a plane parallel to top surface 324). The captured images from second camera assembly 114B may be suitable for transmission to a remote device or may be processed as part of one or more operations of interactive assembly 110, such as a gesture control signal for a portion of interactive assembly 110 (e.g., to engage a graphical user interface displayed at image monitor 112).

As shown, second camera assembly 114B is positioned above cooking appliance 300 (e.g., along the vertical direction V). In some such embodiments, such as that illustrated in FIGS. 1 and 2, second camera assembly 114B is mounted (e.g., fixedly or removably) to a front portion of hood casing 116 (e.g., at image monitor 112). When assembled, second camera assembly 114B may be positioned directly above a portion of cooking appliance 300 (e.g., cooking zone 320 or top surface 324) or, additionally, forward from cooking appliance 300 along the transverse direction T.

In optional embodiments, a lighting assembly 134 is provided above top surface 324 (e.g., along the vertical direction V). For instance, lighting assembly 134 may be mounted to hood casing 116 (e.g., directly above cooking zone 320 or top surface 324). Generally, lighting assembly 134 includes one or more selectable light sources directed toward cooking zone 320. In other words, lighting assembly 134 is oriented to project a light (as indicated at arrows 136) to cooking appliance 300 through open region 130 and illuminate at least a portion of cooking zone 320 (e.g., top surface 324). The light sources may include any suitable light-emitting elements, such as one or more light emitting diode (LED), incandescent bulb, fluorescent bulb, halogen bulb, etc.

During use, lighting assembly 134 may be selectively activated to illuminate a portion of cooking appliance 300 (e.g., top surface 324) based on a received light visibility signal. For instance, lighting assembly 134 may be activated by controller 510A based on direct user input (e.g., depressing a dedicated switch, a gesture control signal, a voice control signal, etc.). In other words, the light visibility signal may be an isolated user input signal.

Alternatively, the light visibility signal may be an automatically-generated signal that does not require direct user input. The light visibility signal may indicate additional light is needed above cooking appliance 300. In turn, controller 510A may automatically activate lighting assembly 134 based on a determined condition. Optionally, controller 510A may vary the activation or light intensity (i.e., luminance) of the light 136 from lighting assembly 134 based on the ambient conditions (e.g., through the open region 130 between cooking zone 320 and hood casing 116). For instance, an ambient light sensor 115 may be positioned above cooking zone 320 (e.g., directly above top surface 324). In some such embodiments, ambient light sensor 115 detects the light available at first camera assembly 114A and transmits a corresponding light visibility signal to controller 510A. Based on the received light visibility signal, controller 510A may direct lighting assembly 134 to activate/deactivate or increase/decrease the intensity of light 136 projected towards cooking appliance 300.

In some embodiments, image monitor 112 is provided above cooking zone 320 (e.g., along the vertical direction V). For instance, image monitor 112 may be mounted to hood casing 116 (e.g., directly above cooking appliance 300, cooking zone 320, or top surface 324). Generally, image monitor 112 may be any suitable type of mechanism for visually presenting a digital image. For example, image monitor 112 may be a liquid crystal display (LCD), a plasma display panel (PDP), a cathode ray tube (CRT) display, etc. Thus, image monitor 112 includes an imaging surface 138 (e.g., screen or display panel) at which the digital image is presented or displayed as an optically-viewable picture (e.g., static image, dynamic or moving video, etc.) to a user. The optically-viewable picture may correspond to any suitable signal or data received or stored by interactive assembly 110 (e.g., at controller 510A). As an example, image monitor 112 may present one or more recipe panels 220 (e.g., predefined regions of preset legible text, static images, or dynamic recorded video relating to an instructional demonstration). As another example, image monitor 112 may present a remotely captured image, such as a live (e.g., real-time) dynamic video stream received from a remote location or a separate portion of system 100. As yet another example, image monitor 112 may present a graphical user interface (GUI) that allows a user to select or manipulate various operational features of interactive assembly 110 or cooking appliance 300. During use of such GUI embodiments, a user may engage, select, or adjust the image presented at image monitor 112 through any suitable input, such as gesture controls detected through second camera assembly 114B, voice controls detected through one or more microphones, associated touch panels (e.g., capacitance or resistance touch panel) or sensors overlaid across imaging surface 138, etc.

As illustrated, the imaging surface 138 generally faces, or is directed, away from cooking appliance 300 (e.g., away from cooking zone 320 or cabinet 310). In particular, the imaging surface 138 is directed toward the area forward from the cooking appliance 300. During use, a user standing in front of cooking appliance 300 may thus see the optically-viewable picture (e.g., recipe panel 220, video stream, graphical user interface, etc.) displayed at the imaging surface 138. Optionally, the imaging surface 138 may be positioned at a rearward non-orthogonal angle relative to the vertical direction V. In other words, the imaging surface 138 may be inclined such that an upper edge of the imaging surface 138 is closer to the rear end 128 of hood casing 116 than a lower edge of the imaging surface 138 is. In some such embodiments, the non-orthogonal angle is between 1° and 15° relative to the vertical direction V. In certain embodiments, the non-orthogonal angle is between 2° and 7° relative to the vertical direction V.

Figure 4:
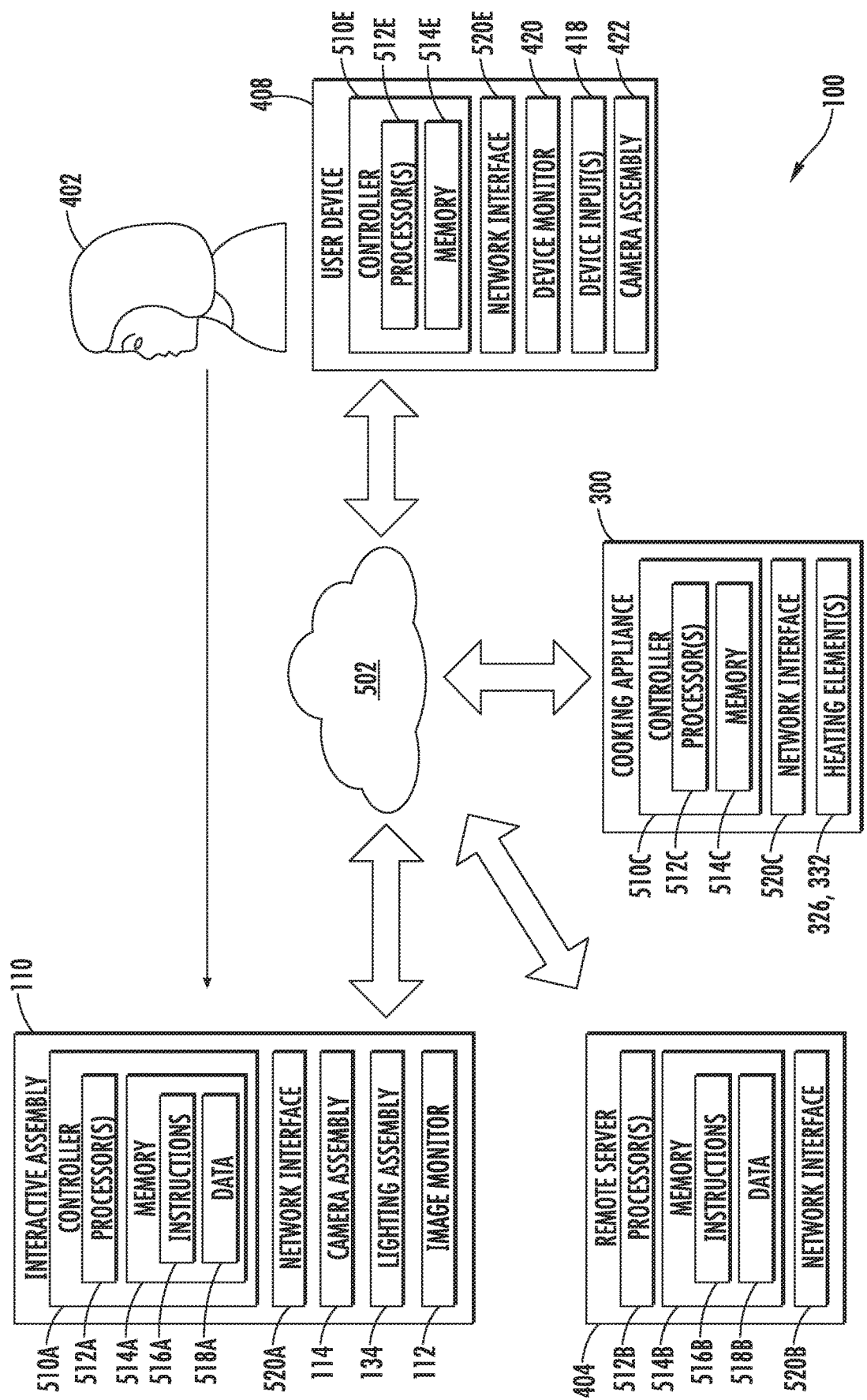
FIG. 4 provides a schematic view of a system for user engagement according to exemplary embodiments of the present disclosure.

FIG. 4 provides a schematic view of a system 100 for user engagement according to exemplary embodiments of the present disclosure. As shown, interactive assembly 110 can be communicatively coupled with network 502 and various other nodes, such as a remote server 404, cooking appliance 300, and one or more user devices 408. Moreover, one or more users 402 can be in operative communication with interactive assembly 110 by various methods, including voice control or gesture recognition, for example. Additionally, or alternatively, although network 502 is shown, one or more portions of the system (e.g., interactive assembly 110, cooking appliance 300, user device 408, or other devices within system) may be communicatively coupled without network 502; rather, interactive assembly 110 and various other devices of the system can be communicatively coupled via any suitable wired or wireless means not over network 502, such as, for example, via physical wires, transceiving, transmitting, or receiving components.

As noted above, interactive assembly 110 may include a controller 510A operably coupled to one or more camera assemblies 114, lighting assemblies 134, and image monitors 110. Controller 510A may include one or more processors 512A and one or more memory devices 514A (i.e., memory). The one or more processors 512A can be any suitable processing device (e.g., a processor core, a microprocessor, an ASIC, a FPGA, a microcontroller, etc.) and can be one processor or a plurality of processors that are operatively connected.

The memory device 514A can include one or more non-transitory computer-readable storage mediums, such as RAM, ROM, EEPROM, EPROM, flash memory device, magnetic disks, etc., and combinations thereof. The memory devices 514A can store data 518A and instructions 516A that are executed by the processor 512A to cause interactive assembly 110 to perform operations. For example, instructions 516A could be instructions for voice recognition, instructions for gesture recognition, receiving/transmitting images or image signals from camera assembly 114 (e.g., 114A or 114B—FIG. 2), directing activation of lighting assembly 134, projecting images at image monitor 112, instructions for a timer (e.g., timer module of controller 510A) for measuring a discrete period of time, or identifying items within a captured image included in a received image signal (e.g., from one or more camera assembly 114). The memory devices 514A may also include data 518A, such as captured image data, identifying data for multiple utensils, or data for a user-guided presentation (e.g., including a plurality of sequenced recipe panels), that can be retrieved, manipulated, created, or stored by processor 512A.

Controller 510A includes a network interface 520A such that interactive assembly 110 can connect to and communicate over one or more networks (e.g., network 502) with one or more network nodes. Network interface 520A can be an onboard component of controller 510A or it can be a separate, off board component. Controller 510A can also include one or more transmitting, receiving, or transceiving components for transmitting/receiving communications with other devices communicatively coupled with interactive assembly 110. Additionally or alternatively, one or more transmitting, receiving, or transceiving components can be located off board controller 510A.

Network 502 can be any suitable type of network, such as a local area network (e.g., intranet), wide area network (e.g., internet), low power wireless networks [e.g., Bluetooth Low Energy (BLE)], or some combination thereof and can include any number of wired or wireless links. In general, communication over network 502 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

In some embodiments, a remote server 404, such as a web server, is in operable communication with interactive assembly 110. The server 404 can be used to host an engagement platform [e.g., for sharing or facilitating instructional demonstrations (such as cooking demonstrations), recipes, etc.]. Additionally or alternatively, the server 404 can be used to host an information database (e.g., for storing a plurality of identifiable utensils, recipes including a plurality of sequenced recipe panels, etc.). The server can be implemented using any suitable computing device(s). The server 404 may include one or more processors 512B and one or more memory devices 514B (i.e., memory). The one or more processors 512B can be any suitable processing device (e.g., a processor core, a microprocessor, an ASIC, a FPGA, a microcontroller, etc.) and can be one processor or a plurality of processors that are operatively connected. The memory device 514B can include one or more non-transitory computer-readable storage mediums, such as RAM, ROM, EEPROM, EPROM, flash memory devices, magnetic disks, etc., and combinations thereof. The memory devices 514B can store data 518B and instructions 516B which are executed by the processor 512B to cause remote server 404 to perform operations. For example, instructions 516B could be instructions for receiving/transmitting images or image signals, transmitting/receiving recipe data packets or signals, etc.

The memory devices 514B may also include data 518B, such as recipe data, image data, etc., that can be retrieved, manipulated, created, or stored by processor 512B. The data 518B can be stored in one or more databases. The one or more databases can be connected to remote server 404 by a high bandwidth LAN or WAN, or can also be connected to remote server 404 through network 502. The one or more databases can be split up so that they are located in multiple locales.

Remote server 404 includes a network interface 520B such that interactive remote server 404 can connect to and communicate over one or more networks (e.g., network 502) with one or more network nodes. Network interface 520B can be an onboard component or it can be a separate, off board component. In turn, remote server 404 can exchange data with one or more nodes over the network 502. In particular, remote server 404 can exchange data with interactive assembly 110. Thus, one or more processes described above with respect to controller 510A may be performed within remote server 404 by controller 510B. Moreover, it is understood that remote server 404 may further exchange data with any number of client devices over the network 502. The client devices can be any suitable type of computing device, such as a general-purpose computer, special purpose computer, laptop, desktop, integrated circuit, mobile device, smartphone, tablet, or other suitable computing device.

In optional embodiments, cooking appliance 300 is in operable communication with interactive assembly 110 via network 502. In turn, controller 510C of cooking appliance 300 may exchange signals with interactive assembly 110. Optionally, one or more portions of cooking appliance 300 may be controlled according to signals received from controller 510A of interactive assembly 110. For instance, one or more heating elements 326, 332 of cooking appliance 300 may be activated or directed to a specific heat output (e.g., in units of British Thermal Units or temperature) based on one or more instruction signals received from controller 510A of interactive assembly 110 or remote server 404.

In certain embodiments, a user device 408 is communicatively coupled with network 502 such that user device 408 can communicate with interactive assembly 110. User device 408 can communicate directly with interactive assembly 110 via network 502. Alternatively, user 402 can communicate indirectly with interactive assembly 110 by communicating via network 502 with remote server 404, which in turn communicates with interactive assembly 110 via network 502. Moreover, user 402 can be in operative communication with user device 408 such that user 402 can communicate with interactive assembly 110 via user device 408.

User device 408 can be any type of device, such as, for example, a personal computing device (e.g., laptop or desktop), a mobile computing device (e.g., smartphone or tablet), a gaming console or controller, a wearable computing device, an embedded computing device, a remote, or any other suitable type of user computing device.

User device 408 can include one or more user device controllers 510E. Controller 510E can include one or more processors 512E and one or more memory devices 514E. The one or more processors 512E can be any suitable processing device (e.g., a processor core, a microprocessor, an ASIC, a FPGA, a controller, a microcontroller, etc.) and can be one processor or a plurality of processors that are operatively connected. The memory device (i.e., memory) can include one or more non-transitory computer-readable storage mediums, such as RAM, ROM, EEPROM, EPROM, flash memory devices, magnetic disks, etc., and combinations thereof. The memory can store data and instructions which are executed by the processor 512E to cause user device 408 to perform operations. Controller 510E may include a user device network interface 520E such that user device 408 can connect to and communicate over one or more networks (e.g., network 502) with one or more network nodes. Network interface 520E can be an onboard component of controller 510E or it can be a separate, off board component. Controller 510E can also include one or more transmitting, receiving, or transceiving components for transmitting/receiving communications with other devices communicatively coupled with user device 408. Additionally or alternatively, one or more transmitting, receiving, or transceiving components can be located off board controller 510E.

User device 408 can include one or more user inputs 418 (e.g., buttons, knobs, one or more cameras, etc.) or a monitor 420 configured to display graphical user interfaces or other visual representations to user. For example, monitor 420 can display graphical user interfaces corresponding to operational features of interactive assembly 110 such that user may manipulate or select the features to operate interactive assembly 110. Monitor 420 can be a touch sensitive component (e.g., a touch-sensitive display screen or a touch pad) that is sensitive to the touch of a user input object (e.g., a finger or a stylus). For example, a user 402 may touch the monitor 420 with his or her finger and type in a series of numbers on the monitor 420. In addition, motion of the user input object relative to the monitor 420 can enable user 402 to provide input to user device 408.

In some embodiments, user device 408 includes one or more camera assemblies 422. Generally, such a camera assembly 422 may be any type of device suitable for capturing a picture or video. As an example, camera assembly 422 may be a video camera or a digital camera with an electronic image sensor [e.g., a charge coupled device (CCD) or a CMOS sensor]. Camera assembly 422 may further be provided in operable communication with controller 510E such that controller 510E may receive an image signal (e.g., static picture signal or video signal) from camera assembly 422 corresponding to the picture(s) captured by camera assembly 422.

User device 408 may provide other suitable methods for providing input to user device 408 as well. Moreover, user device 408 can include one or more speakers, one or more cameras, or more than one microphones such that user device 408 is configured with voice control, motion detection, and other functionality.

Generally, user 402 may be in operative communication with interactive assembly 110, cooking appliance 300, or one or more user devices 408. For instance, a user may wish to alternately operate cooking appliance 300 directly (e.g., through inputs 336) or remotely (e.g., through user device 408 or interactive assembly 110). In particular, a user may wish to control operational features that include activating portions of cooking appliance 300, selecting a temperature or heat setting for cooking appliance 300, or choosing a recipe action to be performed, at least in part by the cooking appliance 300.

In some exemplary embodiments, user 402 can communicate with devices (e.g., interactive assembly 110) using voice control. User 402 may also be in operative communication via other methods as well, such as visual communication.

Figure 6:
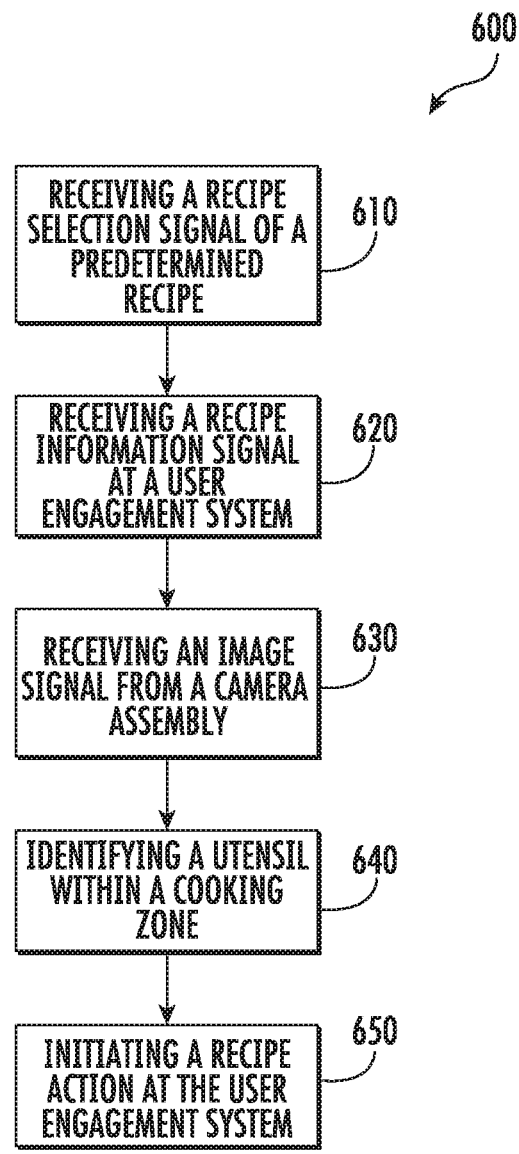
FIG. 6 provides a flow chart illustrating a method of operating a system according to exemplary embodiments of the present disclosure.

Referring now to FIG. 6, various methods may be provided for use with system 100 (FIG. 1) in accordance with the present disclosure. In general, the various steps of methods as disclosed herein may, in exemplary embodiments, be performed by the controller 510A (FIG. 4) as part of an operation that the controller 510A is configured to initiate (e.g., a directed cooking operation). During such methods, controller 510A may receive inputs and transmit outputs from various other components of the system 100. For example, controller 510A may send signals to and receive signals from remote server 404, cooking appliance 300, or user device 408, as well as other components within interactive assembly 110 (FIG. 4). In particular, the present disclosure is further directed to methods, as indicated by 600, for operating system 100. Such methods advantageously facilitate adaptable cooking instruction (e.g., adjacent to cooking appliance 300) according to a predetermined recipe. In certain embodiments, such methods may advantageously adjust recipe instructions according to a particular utensil that is being used by a user following the recipe.

FIG. 6 depicts steps performed in a particular order for purpose of illustration and discussion. Those of ordinary skill in the art, using the disclosures provided herein, will understand that (except as otherwise indicated) the steps of any of the methods disclosed herein can be modified, adapted, rearranged, omitted, or expanded in various ways without deviating from the scope of the present disclosure.

As shown in FIG. 6, at 610, method 600 includes receiving a recipe selection signal of a predetermined recipe. For instance, the recipe selection signal may be received at an interactive assembly or user device, such as in response to a user engaging one or more inputs. Generally, the recipe selection signal may indicate that the user intends to follow the predetermined recipe in order to cook or create a specific food dish or item. Optionally, the predetermined recipe may be selected from list comprising a plurality of predetermined recipes (e.g., stored locally or at a remote server).

At 620, the method 600 includes receiving a recipe information signal that is based on (e.g., derived from or included as part of) the predetermined recipe. In some embodiments, the recipe information signal is received at the user engagement system (e.g., at the interactive assembly or user device). The recipe signal may be received locally (e.g., from memory within the same device) or transmitted wirelessly from a remote device (e.g., a remote server hosting an engagement platform).

In certain embodiments, the recipe information signal includes data that is configured to initiate action at an image monitor (e.g., of the interactive assembly or the remote device at which it is received). The recipe information signal may thus include data to be presented in the form of text, media (e.g., static images, dynamic video, audio, etc.), hyperlinks, or some combination thereof. For instance, along with text data listing various cooking steps, the predetermined recipe may include videos illustrating specific cooking steps to guide a user in following the predetermined recipe.

In exemplary embodiments, the recipe information signal includes data configured to initiate a user-guided presentation of a plurality of sequenced recipe panels. Thus, the recipe information signal may generally include multiple recipe panels to be presented or displayed in a set order or sequence at the image monitor. Each recipe panel may illustrate one or more unique steps or associated information for the predetermined recipe. In some embodiments, the recipe panels include user-viewable media that is preset within the recipe panel and relates to the instructional demonstration. As an example, the recipe panels may include preset legible text relating to the instructional demonstration (e.g., words describing a recipe step). As another example, the recipe panels may include one or more preset static images relating to the instructional demonstration (e.g., pictures demonstrating a recipe step or state of a food product after a recipe step). As yet another example, the recipe panels may include dynamic video (e.g., prerecorded video of a recipe step being performed).

In certain embodiments, the user-guided presentation includes one or more setting instructions for the cooking appliance. The setting instructions may include, for example, a heat setting instruction or a timer setting instruction. For instance, a heat setting instruction of one or more heating elements of the cooking appliance (e.g., within a cooktop or enclosed cooking chamber) to heat the utensil (and food item thereon) may be provided to guide or instruct a user on the proper heat at which to cook a food item. As would be understood, the heat setting may be a relative magnitude of heat (e.g., high, medium, or low) or a specific temperature (e.g., for the enclosed cooking chamber or a particular cooking zone). Additionally or alternatively, a time setting for a discrete time period may be provided to guide or instruct a user on the proper amount of time at which a utensil (and food item contained thereon) should be cooked (e.g., on or within a particular cooking zone).

At 630, the method 600 includes receiving an image signal from a camera assembly of the user engagement assembly (e.g., at the interactive assembly or user device). In some embodiments, the image signal is received from the first camera assembly of the interactive assembly, as described above. Thus, the image signal may include a captured image (e.g., static picture or dynamic video) of a predefined region (e.g., a top surface) of or above a cooking appliance. The predefined region may be captured in the image while a utensil (e.g., pot, pan, tray, etc.) for cooking food is in the predefined region. Optionally, the captured image may be obtained while the utensil is in the same cooking zone in which a user intends to heat the utensil (e.g., on a cooktop) or prior the utensil being placed within a separate cooking zone (e.g., within an enclosed cooking chamber of the cooking appliance).

At 640, the method 600 includes identifying the utensil based on the image signal. For instance, a controller that receives the image signal of 630 may initiate or execute an object-recognition sequence or algorithm to identify one or more aspects of the utensil, as is understood (e.g., by edge matching, divide-and-conquer search, greyscale matching, histograms of receptive field responses, or another suitable routine). Optionally, from the image signal (e.g., the captured image included therein) the utensil may be determined to be a discrete utensil from a plurality of predetermined potential utensils. Additionally or alternatively, the identification may determine one or more physical features (e.g., material, size, shape, etc.) of the utensil. Thus, the particular utensil being used by a user may be determined.

In some embodiments, the identified utensil may be compared to a baseline utensil. The baseline utensil may be included with or as part of the predetermined recipe (e.g., as provided in the recipe signal). From the comparison, it may be determined if or how the identified utensil differs from the baseline utensil, such as if or how the thermal conductivity/resistance is different between the identified utensil and the baseline utensil.

At 650, the method 600 includes initiating a recipe action at the user engagement system. Optionally, the recipe action may be performed by the user engagement system automatically (e.g., without direct user input). Moreover, the recipe action may be performed subsequent to (e.g., based on or in response to) identifying the utensil at 640. Additionally or alternatively, the recipe action may be performed at the same device that receives the recipe information signal (e.g., the interactive assembly or user device) or directly on the cooking appliance. Thus, an action signal may be transmitted locally or to a remote device in order to direct or initiate at least a portion of the recipe action.

In certain embodiments, the recipe action includes initiating or directing the user-guided presentation of the recipe according to the identified utensil. Thus, adjustments may be made to one or more portions of the user-guided presentation based on the identified utensil (e.g., when the identified utensil differs from the baseline utensil). As an example, the burner setting instruction may be adjusted (e.g., increased or decreased relative to a default burner setting instruction) based on the identified utensil. As an additional or alternative example, a time setting instruction, which may describe how long a food item should be heated a given temperature, may be adjusted (e.g., increased or decreased relative to a default time setting instruction).

The adjustments (e.g., to the burner setting instructions, time setting instructions, etc.) may be made according to a predetermined table, chart, or formula (e.g., based on one or more determined differences between the identified utensil and the baseline utensil). The predetermined table, chart, or formula may be included with or correspond to a particular predetermined recipe or, alternatively, may be provided as a generic predetermined table, chart, or formula to be used in multiple, discrete, predetermined recipe. Moreover, once adjustments are made to the user-guided presentation, the adjustments may be displayed with or as part of the user-guided presentation [e.g., within the corresponding recipe panel(s)].

In optional embodiments, actual or current settings may be directed or set (e.g., automatically) according to one or more adjustments. As an example, a heating element (e.g., of the cooktop or cooking chamber) may be directed to an active element setting according to the adjusted heat setting instruction. Specifically, the active element setting may be directed to match the heat setting provided by the adjusted heat setting instruction. As an additional or alternative example, a timer of the user engagement assembly may be directed to measure a discrete time period according to the adjusted time setting instruction. Specifically, the timer may be directed to measure the discrete time period provided by the time setting instruction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a user engagement system adjacent to a cooking appliance, the user engagement system comprising a camera assembly and an image monitor, the method comprising:
   receiving a recipe selection signal of a predetermined recipe;
   receiving a recipe information signal based on the predetermined recipe;
   receiving an image signal from the camera assembly;

identifying a utensil based on the received image signal; and initiating a recipe action at the user engagement system, wherein identifying the utensil comprises determining a utensil material, and wherein the recipe action comprises adjusting a time setting instruction based on the identified utensil, and displaying a user-guided presentation of the predetermined recipe with the adjusted time setting instruction at the image monitor.

2. The method of claim 1, wherein the recipe action comprises adjusting a heat setting instruction based on the identified utensil, and displaying a user-guided presentation of the predetermined recipe with the adjusted heat setting instruction at the image monitor.

3. The method of claim 2, wherein the recipe action further comprises directing a heating element of the cooking appliance to an active element setting according to the adjusted heat setting instruction.

4. The method of claim 1, wherein the recipe action further comprises directing a timer of the user engagement system to measure a discrete time period according to the adjusted time setting instruction.

5. The method of claim 1, wherein the cooking appliance comprises a cooktop of a cooking appliance, and wherein the cooktop comprises a heating element for receiving the utensil thereon.

6. The method of claim 1, wherein the cooking appliance comprises an enclosed cooking chamber of a cooking appliance within which the utensil is received, and wherein the cooking appliance comprises a heating element mounted within the enclosed cooking chamber.

7. The method of claim 1, wherein the camera assembly is positioned directly above the cooking appliance.

8. The method of claim 1, wherein the image monitor is positioned directly above the cooking appliance.

9. A method of operating a user engagement system adjacent to a cooking appliance, the user engagement system comprising a camera assembly and an image monitor, the method comprising:

receiving a recipe selection signal of a predetermined recipe;

receiving a recipe information signal at the user engagement system based on the predetermined recipe, the recipe information signal comprising a plurality of sequenced recipe panels corresponding to the predetermined recipe;

receiving an image signal of the cooking appliance from the camera assembly;

identifying a utensil based on the received image signal; and initiating a user-guided presentation at the image monitor based on the identified utensil, wherein identifying the utensil comprises determining a utensil material, wherein the user-guided presentation comprises a time setting instruction of the predetermined recipe, and wherein the method further comprises adjusting the time setting instruction based on the identified utensil, the initiated user-guided presentation comprising the adjusted time setting instruction at the image monitor.

10. The method of claim 9, wherein the user-guided presentation comprises a heat setting instruction for the cooking appliance of the predetermined recipe, wherein the method further comprises adjusting the heat setting instruction based on the identified utensil, and wherein the initiated user-guided presentation comprises the adjusted heat setting instruction at the image monitor.

11. The method of claim 10, further comprising:

directing a heating element of the cooking appliance to an active element setting according to the adjusted heat setting instruction.

12. The method of claim 9, wherein the method recipe action further comprises directing a timer of the user engagement system assembly to measure a discrete time period according to the adjusted time setting instruction.

13. The method of claim 9, wherein the cooking appliance comprises a cooktop, and wherein the cooktop comprises a heating element for receiving the utensil thereon.

14. The method of claim 9, wherein the cooking appliance is an enclosed cooking chamber of a cooking appliance within which the utensil is received, and wherein the cooking appliance comprises a heating element mounted within the enclosed cooking chamber.

15. The method of claim 9, wherein the camera assembly is positioned directly above the cooking appliance.

16. The method of claim 9, wherein the image monitor is positioned directly above the cooking appliance.

* * * * *